United States Patent
Mosey

[11] Patent Number: 6,053,083
[45] Date of Patent: Apr. 25, 2000

[54] TURNING AND BORING MACHINE WITH DOUBLE CENTERING POSITIONERS

[76] Inventor: George N. Mosey, 1912 Morrow Rd., Richmond, Ind. 47374

[21] Appl. No.: 09/031,205

[22] Filed: Feb. 26, 1998

[51] Int. Cl.[7] .............................. B23B 23/00; B23B 13/00
[52] U.S. Cl. ................................ 82/170; 82/1.11; 82/124; 82/164; 82/165; 83/914; 279/133
[58] Field of Search ............................. 82/1.11, 124, 125, 82/129, 162, 164, 165, 170; 83/914; 279/127, 133

[56] References Cited

U.S. PATENT DOCUMENTS

| | | | |
|---|---|---|---|
| 2,387,214 | 10/1945 | Corey | 82/1.11 |
| 3,756,099 | 9/1973 | Sullivan . | |
| 3,783,718 | 1/1974 | Kuhne et al. | 82/117 |
| 3,790,058 | 2/1974 | Filkorn | 83/914 |
| 3,948,121 | 4/1976 | Shaumian et al. | 82/125 |
| 4,800,683 | 1/1989 | Schwar | 82/106 |
| 5,293,794 | 3/1994 | Mosey | 82/125 |
| 5,421,229 | 6/1995 | Grossmann et al. | 82/124 |

FOREIGN PATENT DOCUMENTS

| 0837558 | 6/1981 | U.S.S.R. | 82/1.11 |
|---|---|---|---|

*Primary Examiner*—Henry W. H. Tsai
*Attorney, Agent, or Firm*—Woodard, Emhardt, Naughton, Moriarty & McNett Patent and Trademark Attorneys

[57] ABSTRACT

A work station between an active spindle adaptor and a passive spindle adaptor having a common rotational axis, receives a workpiece ring supplied from a loader shuttle. The ring has circular outer edges in parallel spaced planes perpendicular to the cylindrical axis of the ring. Chamfered centering crescents on oppositely facing ring positioners engage opposite edges of the ring and simultaneously clamp and center the ring on the spindle axis. The active spindle then moves the clamped ring to position abutting the passive spindle adaptor and clamps the ring between the spindles. The crescents retract, the active spindle rotates the ring and the ring is machined outside and inside simultaneously. External turning tools are fixed to one toolholder slide, and an additional external tool is movably mounted to the slide. A workpiece supply chute and shuttle loader are arranged to enable supply of rings individually in sequence for machining in sequence or, alternatively, to supply rings in pairs for machining simultaneously in pairs.

33 Claims, 15 Drawing Sheets

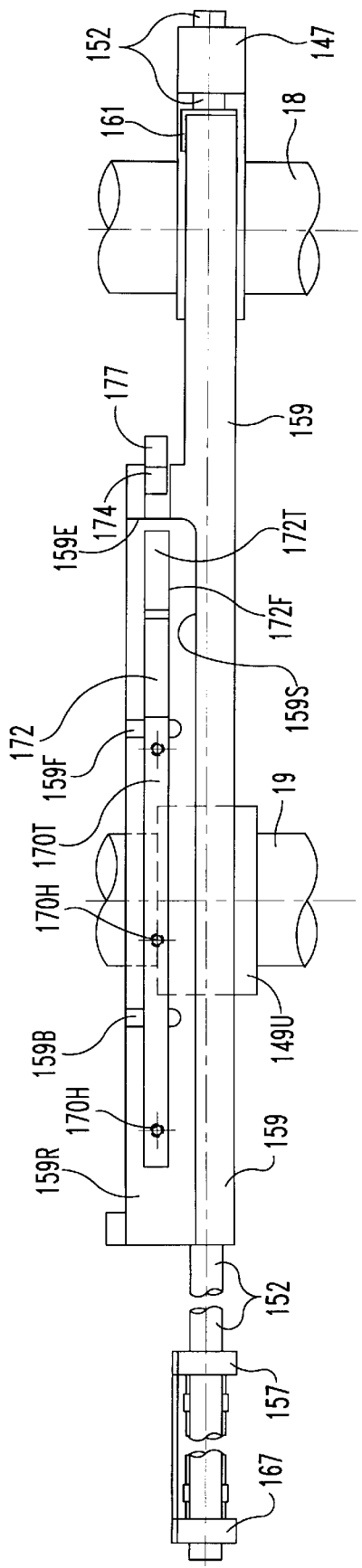
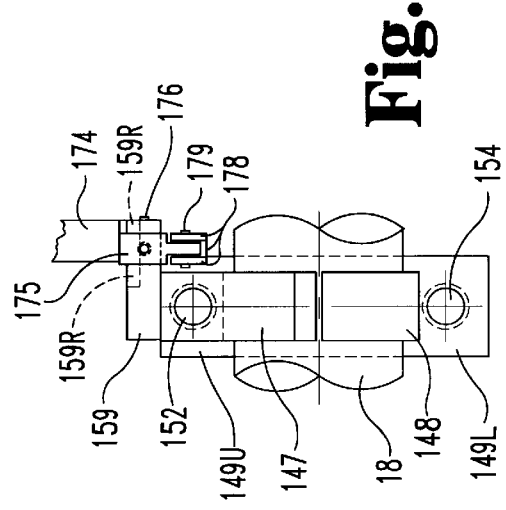
Fig. 12
Fig. 13

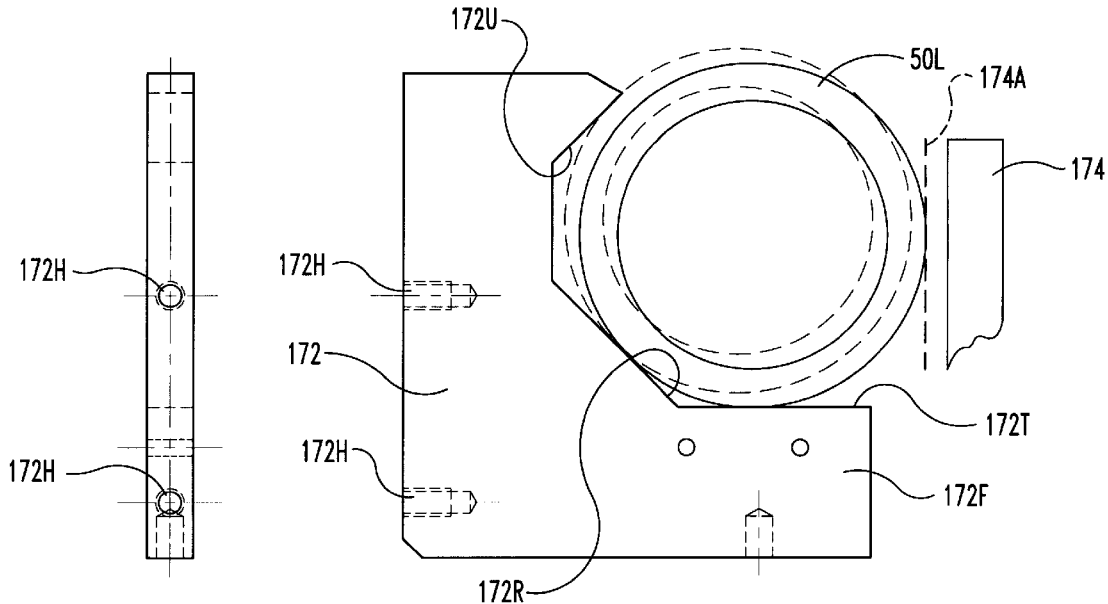
Fig. 18  Fig. 17
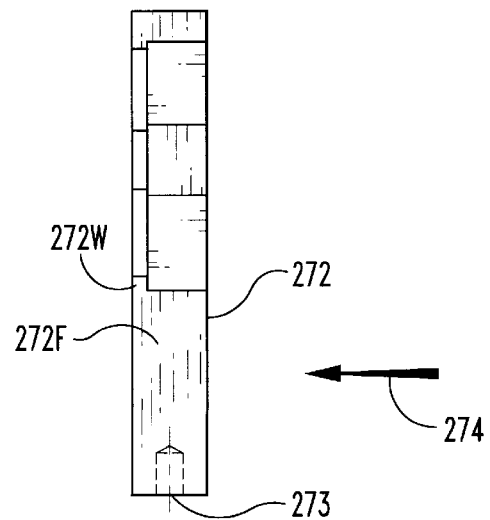
Fig. 19

6,053,083

TURNING AND BORING MACHINE WITH DOUBLE CENTERING POSITIONERS

BACKGROUND OF THE INVENTION

1. Field of the Invention

This invention relates generally to machine tools, and more particularly to a turning machine which simultaneously removes material from both the outer and inner cylindrical surfaces of rings.

2. Description of the Prior Art

A U.S. Pat. No. 5,293,794 issued to me on Mar. 15, 1994, some of the disclosure of which is incorporated herein directly, and the rest of which is intended to be incorporated by reference if needed, shows and describes a turning and boring machine which receives workpiece ring blanks supplied to a work station by a shuttle. It uses a linearly-driven, crescent-shaped workpiece positioner, to move a workpiece ring in one direction toward a position against the end of an idle, powered spindle while, at the same time, centering the workpiece ring on the spindle axis. Because of the centering function, the positioner is sometimes referred to as a "centering ring." The powered spindle then moves the workpiece ring, with the positioner still engaged with the workpiece ring, linearly in the opposite direction, to force the workpiece ring against a locating spindle on the same spindle axis, clamping the workpiece ring against the locating spindle. Then the centering positioner retracts to a home position, the powered spindle begins rotating the workpiece ring on the spindle axis, and turning tools are advanced to machine both the interior and exterior surfaces of the workpiece ring to finished dimensions to form a bearing race, for example. Then the powered spindle is stopped and retracted and the finished workpiece exits the work station by gravity.

The machine described in the above-mentioned patent introduced new concepts for machined ring production, for speed and efficiency. The present invention facilitates production of larger and heavier parts, individually. It also facilitates processing multiple parts simultaneously.

SUMMARY OF THE INVENTION

Described briefly, according to a typical embodiment of the present invention, a turning and boring machine is provided with a frame structure comprising four parallel structural rods secured between end stands. A workpiece clamp slide is mounted and guidedly slidable on the rods. It supports an active driving spindle for rotating the workpiece on a turning axis. The clamp slide is hydraulically drivable axially toward a passive (driven) spindle stop rotatably mounted but axially immovable on one of the stands, to clamp the workpiece between the two spindles. The driving spindle is rotatable by the main machine drive motor for turning the workpiece. One or more workpieces in the form of rings is/are supplied through a guide apparatus that is adjustable to accommodate different widths of workpiece rings to be processed, regardless of whether the rings are to be processed individually or in pairs. Rings are introduced laterally to the working area by a loader. Then the ring/s is/are centered in the work space by two hydraulically drivable, axially driven centering crescents which keep the ring/s centered on the machine turning axis as the ring/s is/are clamped in position between the driving spindle and driven spindle for the turning to commence. Cylindrical slides and slideways are provided at right angles for both radial and axial movement of the external tool mounting bar. An additional slide is provided in the external tool mounting bar for mounting additional external tools for additional external machining capabilities. Cylindrical slides at right angles to each other are also provided for radial and axial movement of a boring bar along the spindle axis. Drive of some of the slides is provided by lead screws. The finished ring/s exit by gravity for subsequent gauging in a manner described in the aforesaid patent or otherwise.

BRIEF DESCRIPTION OF THE DRAWINGS

FIG. 12 is a top plan view of the loader assembly on a slightly smaller scale than FIG. 11.

FIG. 13 is an enlarged end view of the loader assembly taken at line 13—13 in FIG. 11.

FIG. 17 is an enlarged elevational view of a part shoe, with a workpiece ring resting on it and a ring stop-bar (finger) shown fragmentarily.

FIG. 18 is a front end view of the part shoe itself.

FIG. 19 is a front end view of an alternate form of part shoe, having a retaining flange on it.

DESCRIPTION OF THE PREFERRED EMBODIMENT

Figure 1:
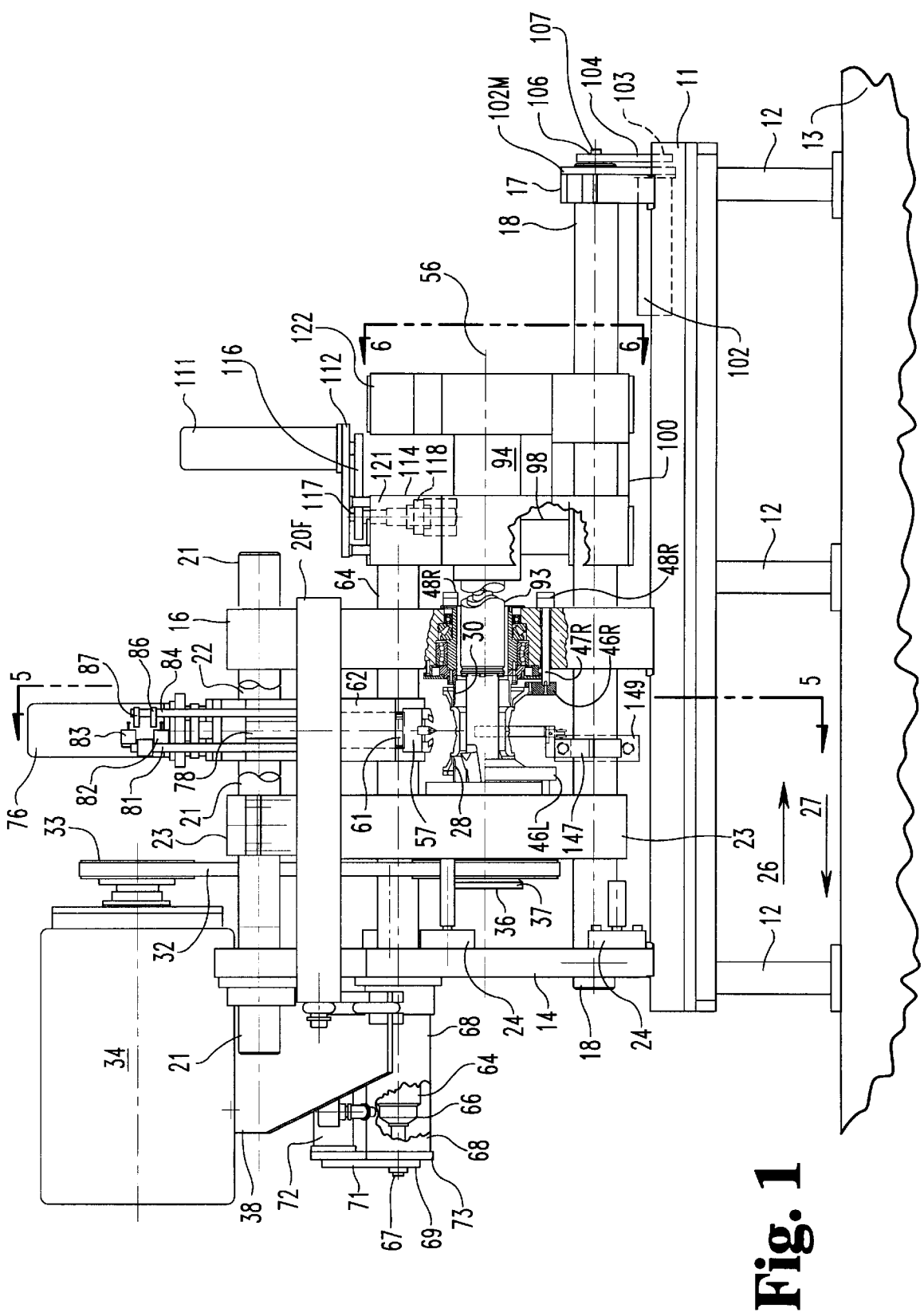
FIG. 1 is a front elevational view of a turning and boring machine according to a typical embodiment of the present invention.
Figure 2:
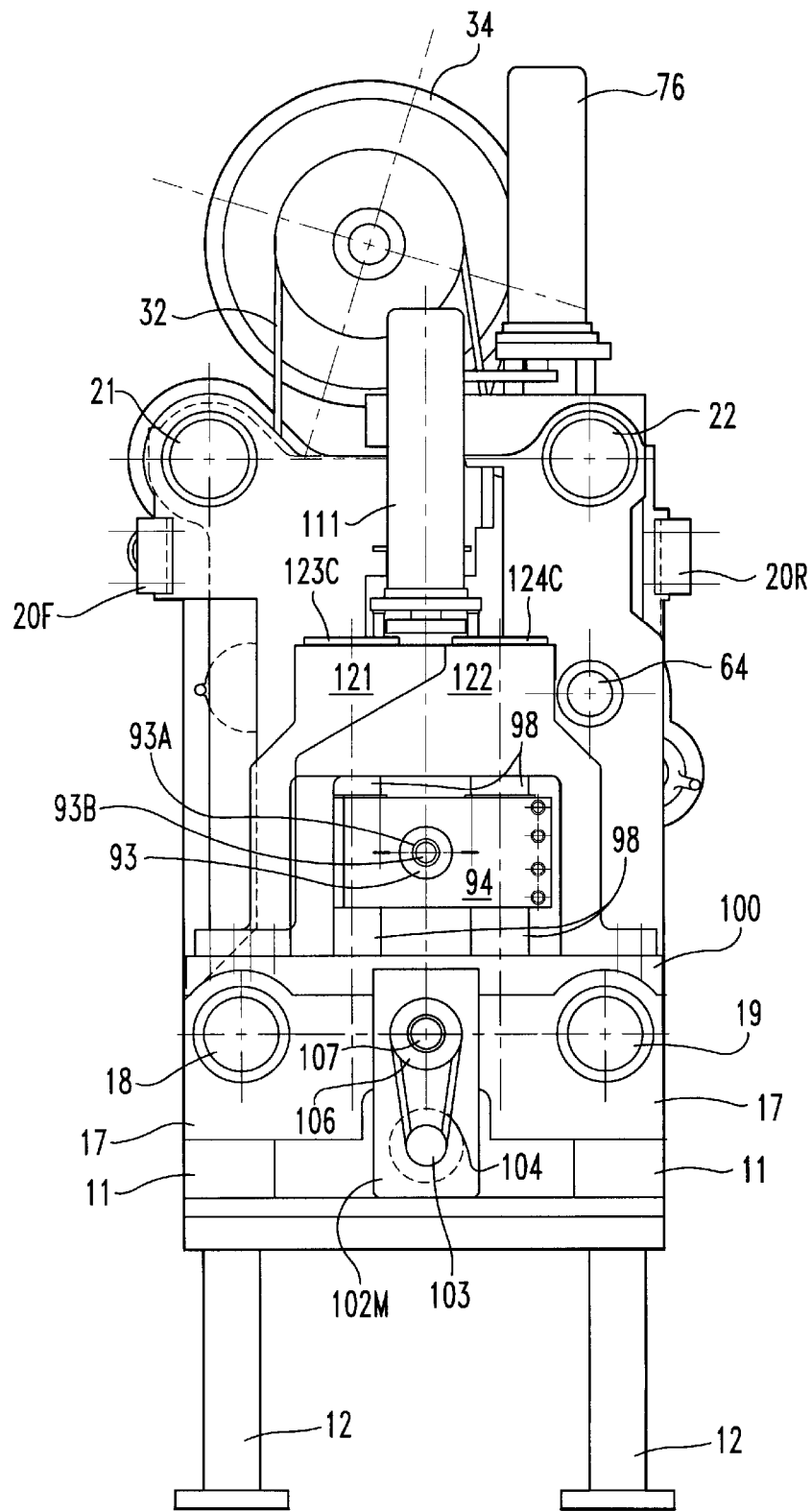
FIG. 2 is a right-hand elevational view thereof.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the machine includes a base mounting plate 11 which stands on six legs 12 which are set on floor 13. Three stands 14, 16 and 17 are received in notches, wedged and bolted and thereby fixed to the base. They support two cylindrical lower structural bars 18 and 19. There are front and rear upper tie bars 20F and 20R, respectively, which are of rectangular cross section, fittingly received and wedged tight in outwardly opening notches in stands 14 and 16, and bolted to these stands. The two stands 14 and 16 also support two upper cylindrical structural bars 21 and 22. The six bars and three stands form a rigid framework on which other features of the machine are mounted.

Figure 7:
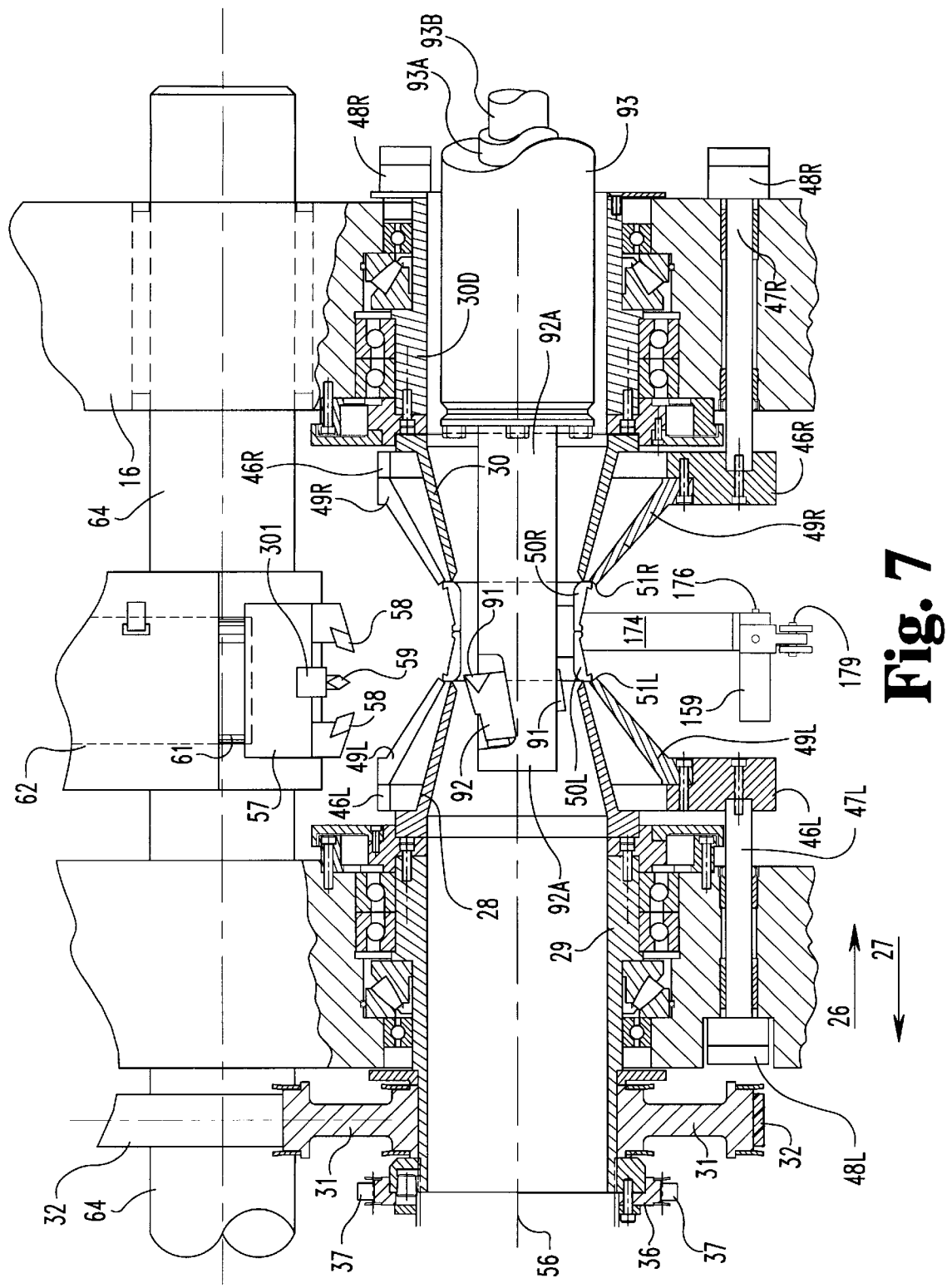
FIG. 7 is an enlarged fragmentary axial section corresponding to the central portion of FIG. 1, showing the workpiece locator, gripper and driver details, but processing rings of a smaller size than those represented in FIG. 1.

A clamp plate 23 has four apertures therein with ceramic coated sleeve bearings slidably received on the four bars 18, 19, 21 and 22. There are three double acting hydraulic actuators 24 (two of them as shown in FIG. 1) fixed to the stand 14 and having their output members connected to the clamp plate 23 to drive it to the right and left in the $Y_1$-axis direction of arrows 26 and 27, respectively. An adaptor 28 to engage and rotate a workpiece is fastened to a driving spindle assembly 29 (FIG. 7) by a circular array of socket head cap screws. In FIG. 7 this workpiece rotator-adaptor is cone-shaped. In FIG. 1 it is cylindrically-shaped. The same applies to adaptor 30 bolted to the left-hand end of the passive spindle assembly 30D. This is to illustrate that the rotator 28 can be provided in different sizes and shapes and readily replaced to adapt to different sizes of workpieces, such as the relatively larger ones in FIG. 1 and the relatively smaller ones in FIG. 7. The driving spindle assembly 29 is mounted in ball and tapered roller bearings in the clamp plate 23 and extends out the left-hand side of the plate and receives a gear belt sprocket 31 which is keyed thereon. This sprocket receives the gear belt 32 driven by sprocket 33 on the spindle drive motor 34. A rotary encoder belt drive sprocket 36 is fastened to the left-hand end of the driving spindle assembly 29 and receives the encoder belt 37 thereon.

Figure 3:
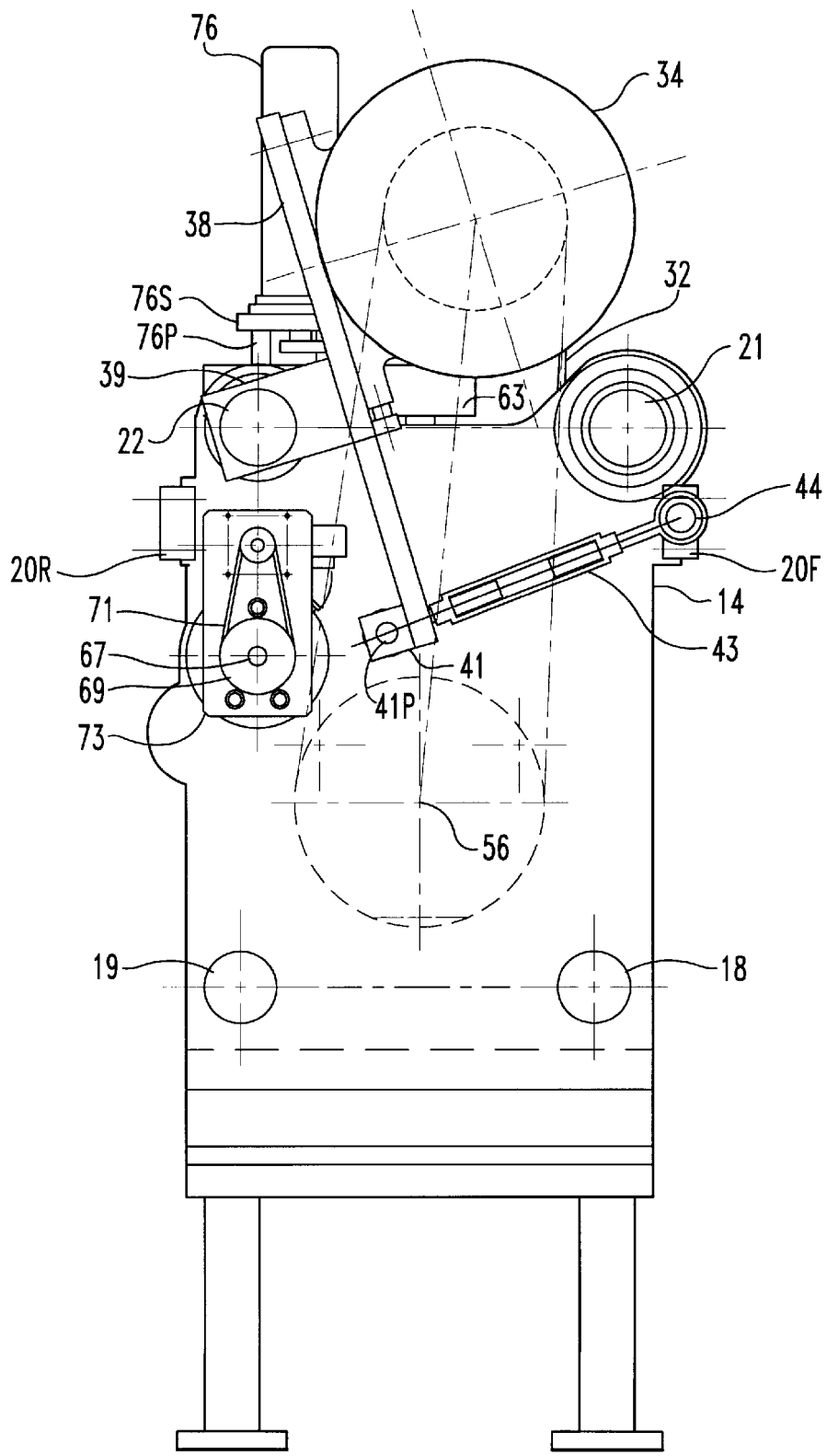
FIG. 3 is a left-hand elevational view thereof.
Figure 8:
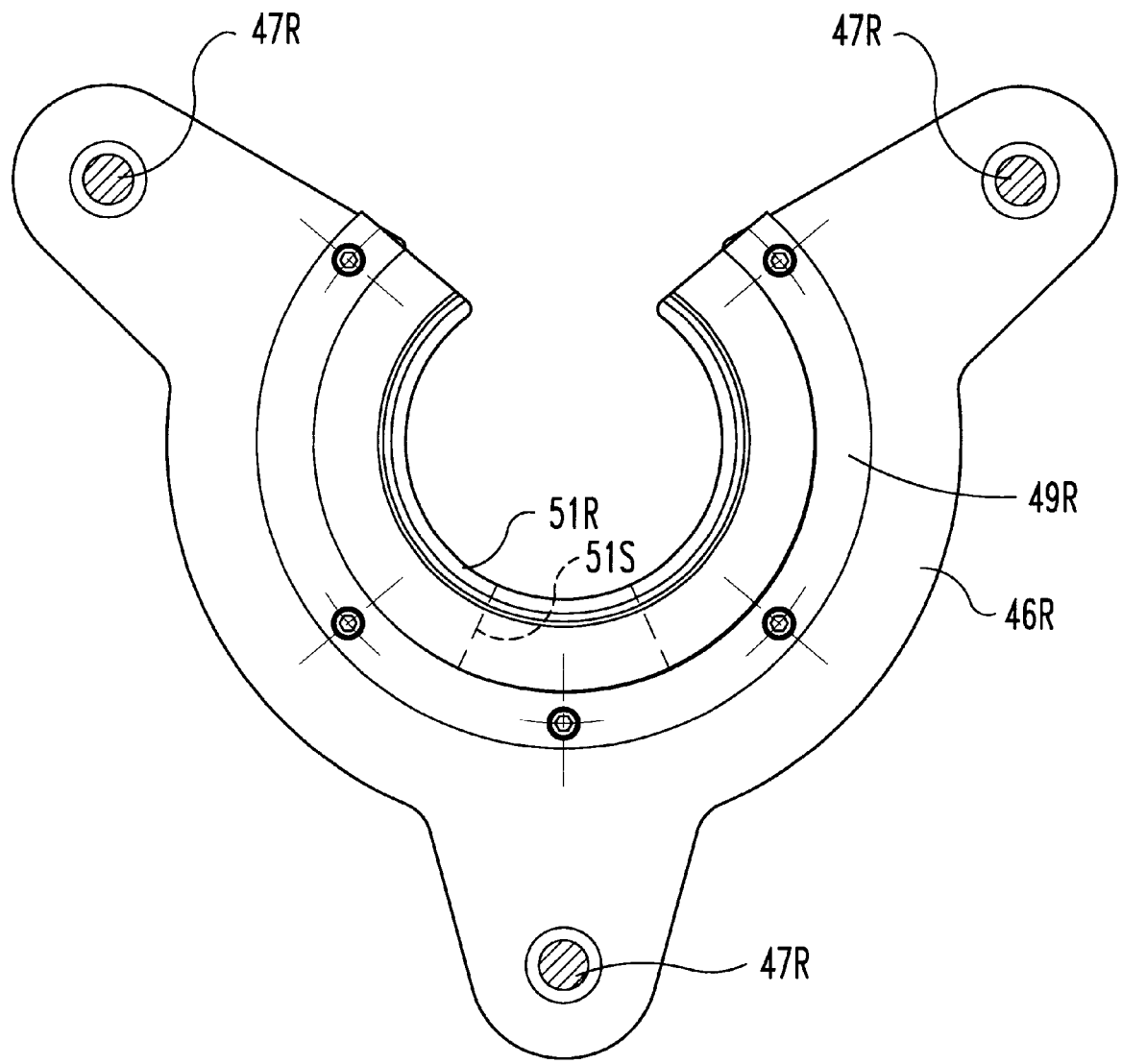
FIG. 8 is a further enlarged axial view of the workpiece positioner mounted to the positioner mounting plate.

The motor 34 is secured to a motor mounting plate 38 having a bracket portion 39 (FIG. 3) formed thereon and which is pivotally mounted on the left-hand end extension of frame bar 22. The lower end of motor mounting plate 38 has rearwardly extending brackets 41 having a pin 41P therethrough receiving the connector eye 42 of a turnbuckle assembly 43 having its upper end eye pinned at 44 to the left-hand end of the tie bar 20F. This assembly is useful to adjust the tension of the spindle drive belt 32. Referring further to FIGS. 1, 7 and 8 there is a workpiece positioner mounting plate 46R mounted to three locator support rods 47R connected to three double acting hydraulic actuators 48R (FIGS. 1 and 7) circularly spaced and fastened to the stand 16. Plate 46R has a positioner 49R (FIG. 7) fastened to it and which has a chamfer 51 providing a lead-in and guiding and centering surface for the workpiece ring 50R as will be described hereinafter.

Since this machine is a turning and boring machine, the workpiece for which this machine is intended is a ring which may be made into a bearing race or the like. It is first cut from seamless tubing by sawing it on a machine such as the saw disclosed in U.S. Pat. No. 4,347,770 issued Sep. 7, 1982. That saw is capable of simultaneously cutting a length of seamless tubing into a plurality of essentially identical rings whose end faces are rather precisely parallel. Those rings may then be loaded into a chute 52 (FIG. 5) from which they descend onto loader assembly 53 which can transport the rings in the direction of arrow 54 (FIG. 5) to the spindle center line 56. The rings can be transported one-at-a-time as described in the above-mentioned U.S. Pat. No. 5,293,794, or in pairs as described herein. Upon arrival at the center line 56, the ring/s can be located, centered, gripped and machined as will be described hereinafter.

Figure 5:
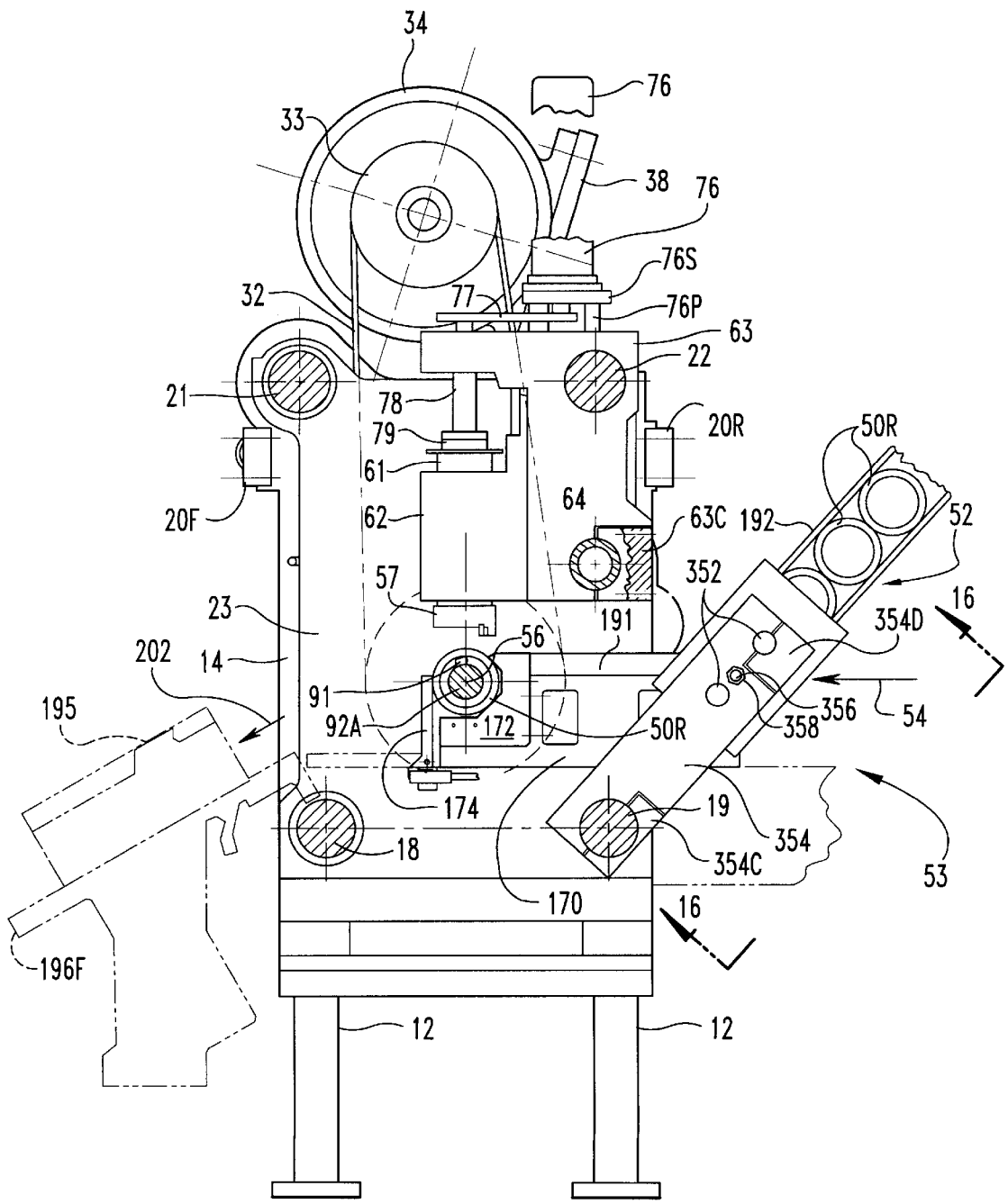
FIG. 5 is a vertical section taken immediately adjacent the workpiece at line 5—5 in FIG. 1 and viewed in the direction of the arrows, but showing a workpiece ring of lesser diameter than the rings represented in FIG. 1.
Figure 9:
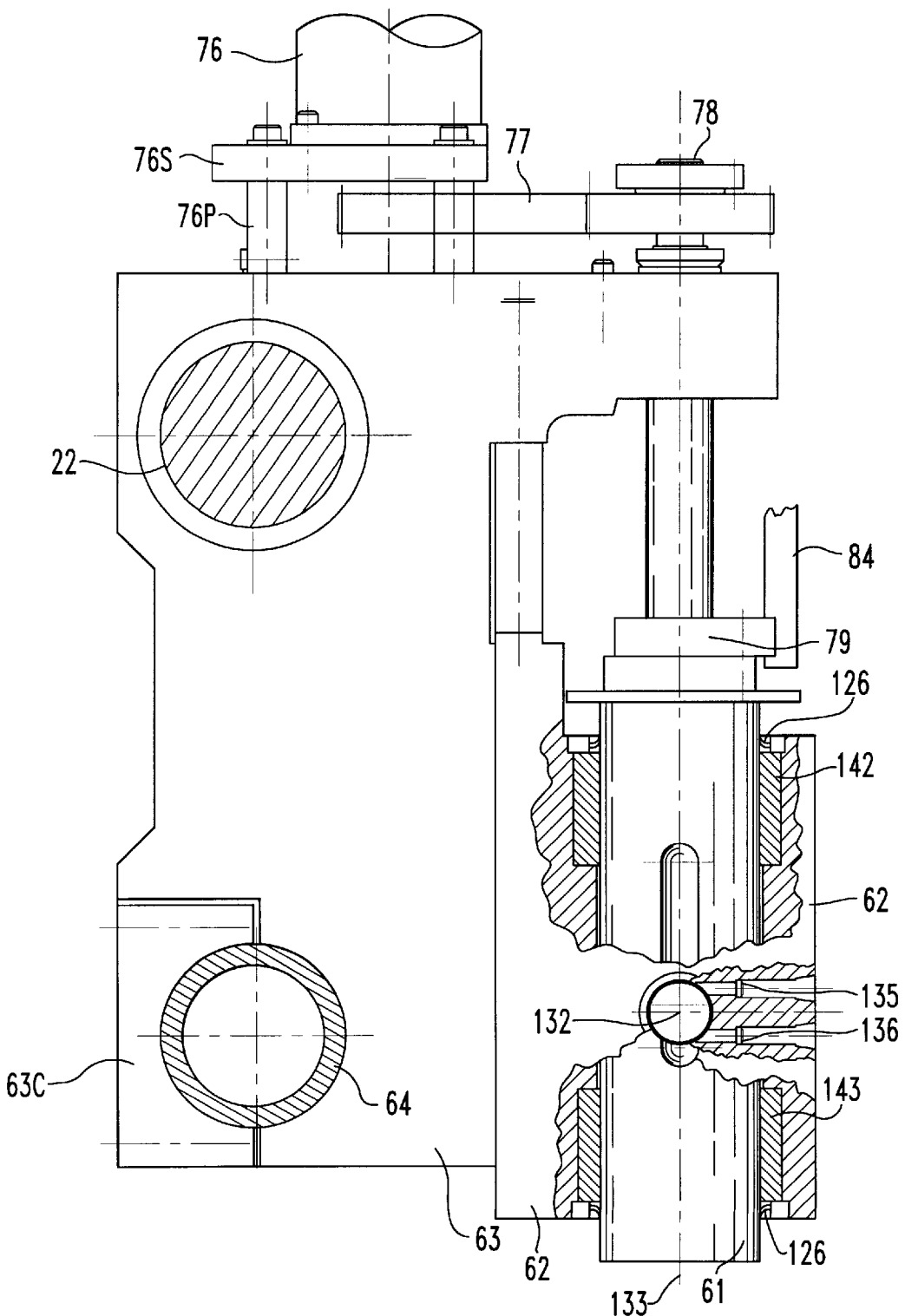
FIG. 9 is an enlarged elevational view of the $X_1$-axis turning slide assembly looking from left to right in FIG. 1 and with portions broken away to show interior details.
Figure 10:
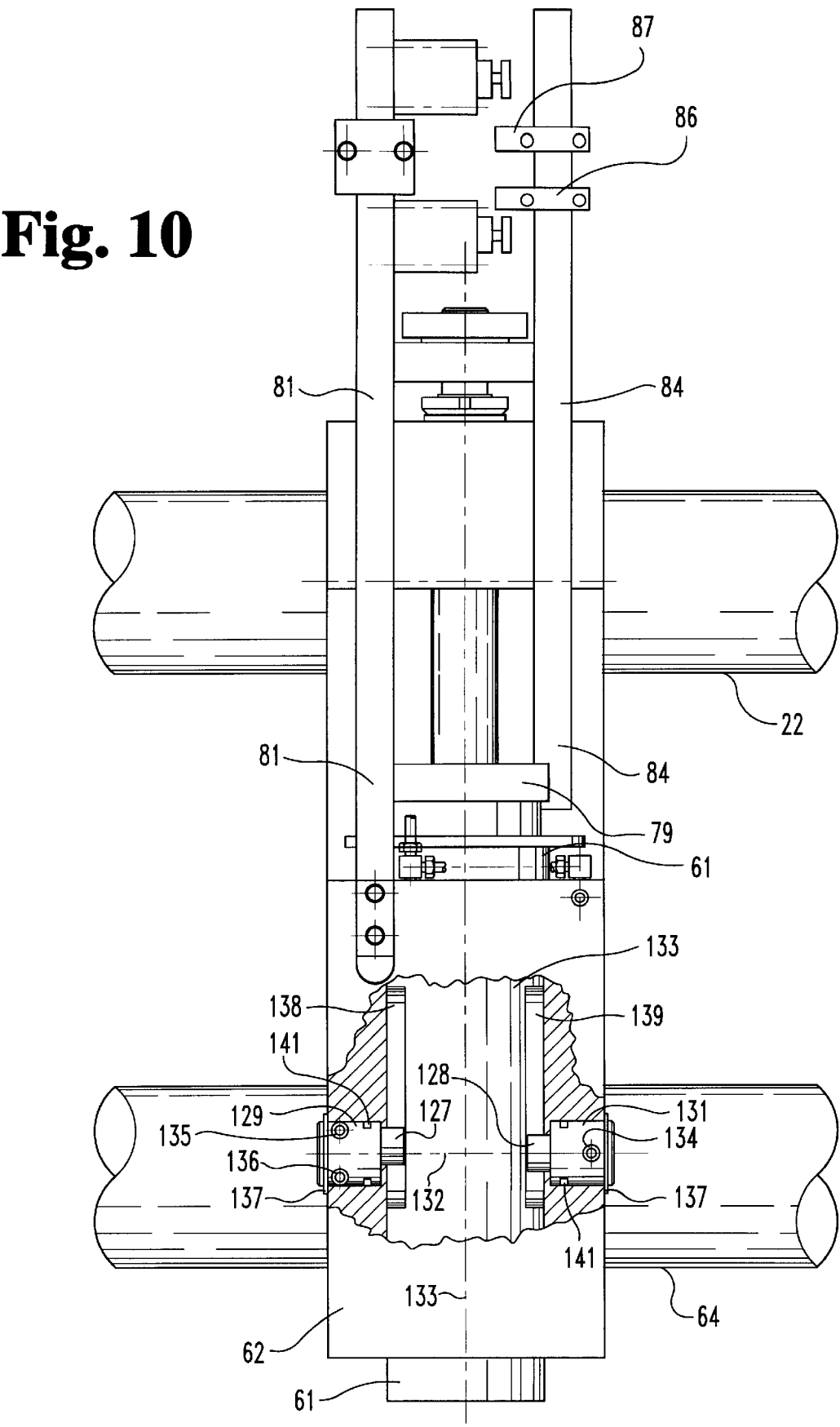
FIG. 10 is a fragmentary front elevational view thereof.

Since this is a turning and boring machine, the turning tooling will first be described. Referring to FIGS. 1, 5 and 7, a toolholder 57 holds turning tools 58 for machining the outside cylindrical surface of the rings 50L and 50R. It also holds a tool 59 movable relative to tools 58 and useful, among other ways, for chamfering the edges at the intersection of the outer cylindrical surface and the end faces of the rings. Toolholder 57 is secured to the end of a cylindrical quill-type slide 61 (FIGS. 5, 9 and 10), which is mounted in ceramic coated bearings in the slide housing 62 which, itself, is fastened to the turning slide base 63 which is slidably mounted to the bar 22 for movement to the right and left ($Y_1$-axis) in the direction of arrows 26 and 27 (FIGS. 1 and 7). The lower end of the turning slide base 63 is clamped by cap screws through block 63C to a tube 64 which is slidably mounted in a ceramic coated bushing in the stand 14 and a ceramic coated bushing in stand 16. Tube 64 has a ball nut 66 fastened to the left-hand end of it (FIG. 1) and which receives the drive screw 67 mounted in housing 68. The drive screw has a sprocket 69 on its left-hand end and which is driven by a gear belt 71 from the Y1 axis turning tool drive motor 72. The motor 72 and drive screw housing 68 are secured together by end face mounting plate 73. Housing 68 is fastened to stand 14.

The $X_1$ axis (vertical) drive for the turning tools is provided by motor 76 (FIGS. 1, 3 and 5) fastened to motor mounting plate 76S supported on and fastened to four posts 76P by four bolts as 76B (FIG. 4), the posts being fastened to the turning tool slide mount 63 by studs. Motor 76 drives a belt 77, driving a sprocket at the top of a screw 78 (FIG. 5) received in a ball nut 79 fastened to the top of the $X_1$ axis slide 61. An accessory bar 81 (FIG. 1; not shown in the other figures) fastened to slide housing 62 supports limit switches 82 and 83. Accessory bar 84 fastened to slide 61 supports limit switch operating cams ("trip dogs") 86 and 87.

For the tool 59, there is a toolholder 301 having a rectangular hole in the lower end receiving the tool 59 which is secured therein by set screw 302. The toolholder has a cylindrical body received in the bore 303 in slide 61. A toolholder stop plug 304 is received in the cylindrical cavity in the top of holder 301 and fixed in place by set screw 305. It is sealed in the cavity by the O-ring seal 306, and the toolholder itself is sealed in bore 303 by the O-ring 307.

Figure 15:
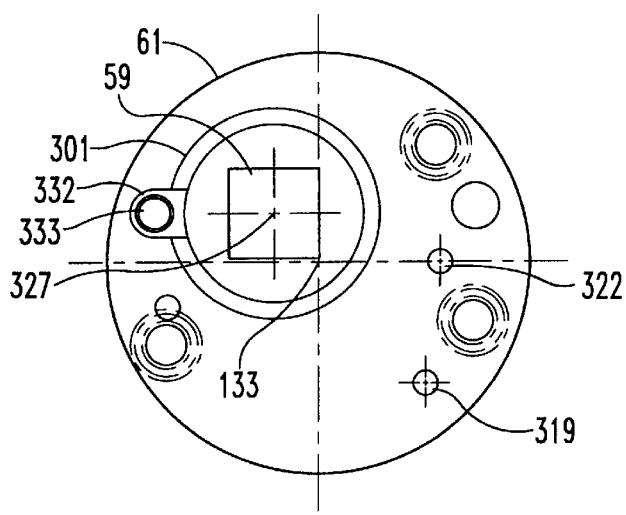
FIG. 15 is a bottom end view thereof.
Figure 16:
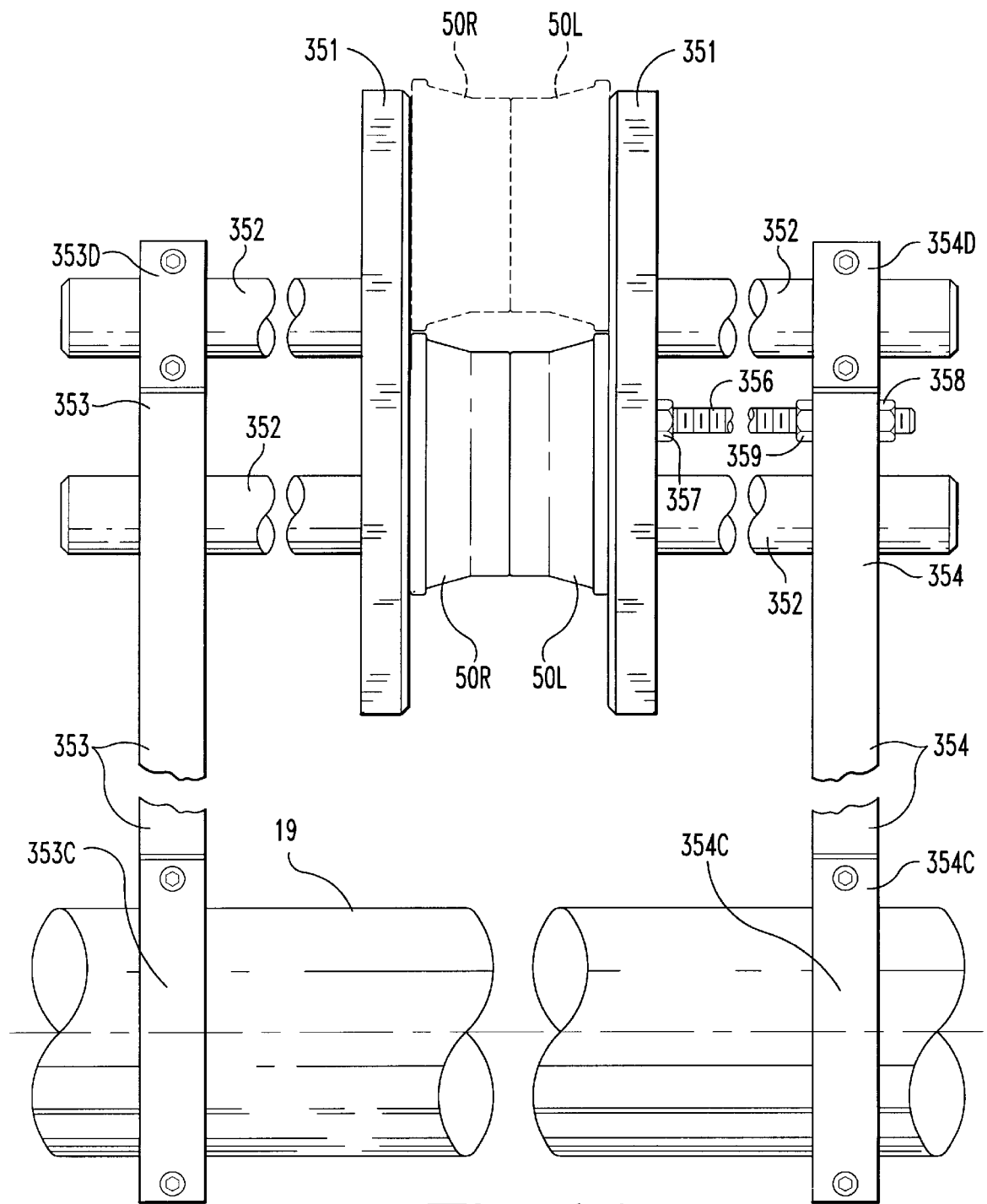
FIG. 16 is an enlarged view of the part guide taken at line 16—16 at 15—15 in FIG. 5 and viewed in the direction of the arrows.

A socket head cap screw 308 received in the stop plug 304 is secured in the lower end of the piston rod of the piston whose head 311 is slidably received in the bore 312 in the slide 61. It is sealed in that bore by the O-ring 313. A stationary bulkhead 314 is secured at the step between the bores 303 and 312 and is retained on the step by a snap ring 316. It is sealed to the bore 303 by O-ring seal 317 and to the piston rod by O-ring seal 318. A hydraulic fluid passageway 319 in the slide 61 provides for application of hydraulic pressure to the chamber 321 above the piston to drive the tool downward to a position where it is either stopped against the workpiece or the downward travel stops when the piston head 311 engages the stationary bulkhead 314. To retract or reverse the toolholder 301 within the slide 61, a hydraulic fluid passageway 322 opens into the chamber 323 under the piston head 311 and above the bulkhead 314 to enable driving the tool upward for retraction of the tool from the workpiece. Upward travel of the piston is limited by engagement of the toolholder stop with the underside of the bulkhead 314. As shown in FIG. 15, the center line of 327 of the tool is offset from the center line 133 of the slide 61. A hydraulic fluid passageway 324, communicating with passageway 319, opens into the chamber 326 between the bulkhead 314 and the top of the toolholder 301. Pressurization of the passageway 319 will drive the tool 59 downward into engagement either with the workpiece or the stop inside the slide 61. Venting of this passageway, and pressurization of passageway 322 will reverse the toolholder 301 fully to engagement against the bulkhead 314.

Figure 6:
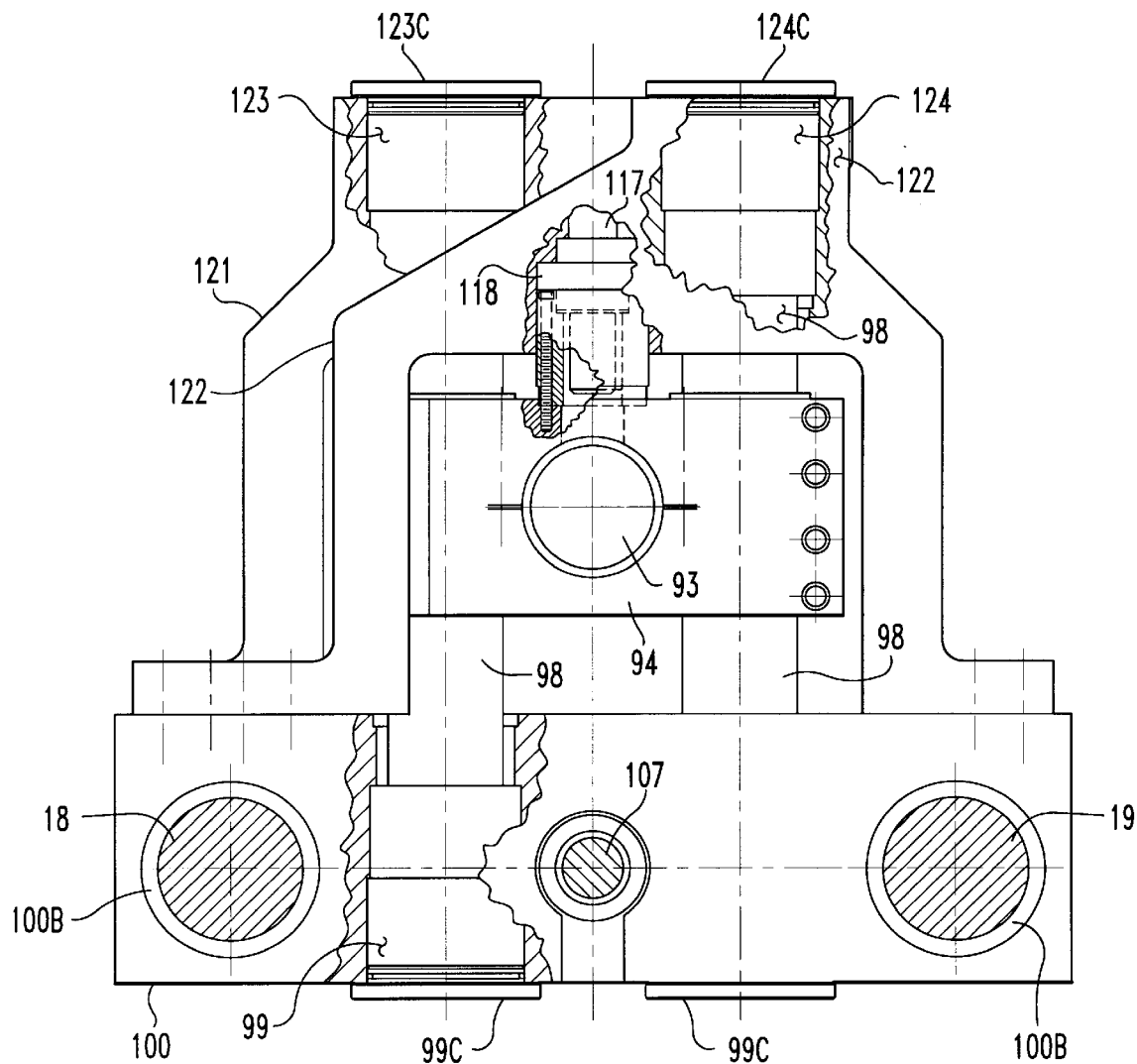
FIG. 6 is a vertical section taken at line 6—6 in FIG. 1 and viewed in the direction of the arrows and showing the boring bar vertical positioning features.

For the boring function of the machine, boring tools 91 (FIG. 7) are fastened in a toolholder 92 mounted in an adapter 92A, fastened by a circular array of socket head cap screws to the end of a boring "bar" 93. The boring bar is a rigid tube clamped in the boring bar $X_2$ axis ("cross slide") carriage 94 (FIGS. 1, 4, and 6) which is clamped to and guided on three vertical guide bars 98 each of whose lower end is slidably received in ceramic coated aluminum bushing 99 fixed in an upwardly opening bore in the Y2 axis carriage 100, the bushing being secured in place against a downwardly facing shoulder in the carriage by bearing cap 99C bolted to the bottom of the carriage. There are four horizontally extending ceramic coated aluminum bushings 100B fixed in carriage 100, two of them slidably received on guide bar 18 and two slidably received on guide bar 19 whereby the boring $Y_2$ axis carriage 100 is slidably moveable in the direction of arrows 26 and 27. A boring $Y_2$ axis drive motor 102 (FIGS. 1 and 4) is secured to a motor mounting plate 102M fixed to the right-hand guideway-bar mounting stand 17. Motor 102 drives a sprocket 103 which drives gear belt 104, which drives a sprocket 106 which drives a lead screw 107 threaded into the ball nut 108 secured to carriage 100 for driving the carriage to the right and left in the direction of arrows 26 and 27, respectively. An additional tube and operating rod 93A and 93B, respectively, may be mounted in the boring bar for adjusting or re-orienting the toolholder 92 in the end of the boring bar adapter 92A by remote control during operations, if desired, as the right-hand end of the boring bar is accessible for mounting operators for operating such devices.

As mentioned above, the lower ends of the three vertical guide bars 98 are slidably received in bearings 99 fixed in the $Y_2$ axis carriage 100. For guiding support of the upper ends of these guide bars, two bridges 121 and 122 are provided. The left-hand (FIGS. 1 and 4) bridge 121 has two bearings 123 (FIG. 6) in it mounted exactly like the bearings for the lower ends of guide bars in the $Y_2$ axis carriage and fixed in place against upwardly facing shoulders in bridge 121 by bearing caps 123C bolted to the top of the bridge. Similarly, the right-hand bridge has a bearing 124 fixed in it by bearing cap 124C bolted to the top of the right hand bridge 122. The bushing 124 receives the upper end of the right-hand vertical guide bar 98. All three of these upper end bushings are fixed in their respective pockets by caps fastened to the tops of the respective bridges 121 and 122 by socket head cap screws. The upper and lower vertical guide bar bushings enable a limited amount of vertical travel of the bars 98 therein.

Figure 4:
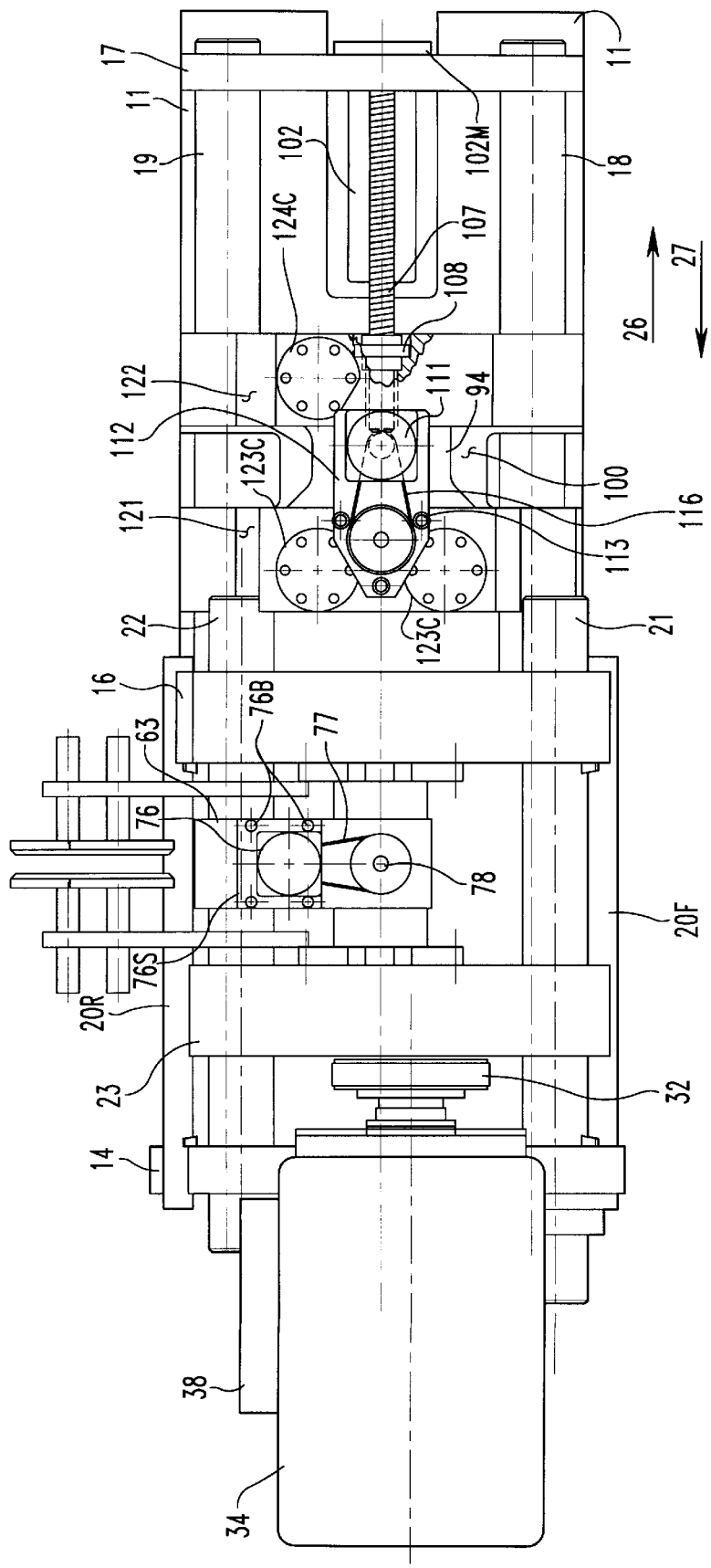
FIG. 4 is a top plan view thereof.

Vertical drive for the $X_2$ axis carriage 94 is provided by motor 111 mounted to the plate 112 which is fastened by three bolts 113 in FIG. 4 through spacers to the top of the $Y_2$ axis carriage bridge 121. The output shaft of motor 111 drives a sprocket driving gear belt 116 driving a sprocket at the upper end of the $X_2$ drive screw 117 which is a ball screw received in a ball nut 118 which is fixed to the $X_2$ axis carriage 94. As mentioned above, this carriage is slidably guided by the three vertical guide bars 98 in bushings 99 at the bottom and 123 and 124 at the top as the boring bar slide is driven up and down by the motor 111 driving the ball screw.

Referring now to FIG. 8, the part positioner 49R is shown secured to the positioner mounting plate 46R, the post-script "R" referring to the right hand as the machine is viewed in FIGS. 1 and 7. The part positioner 49L and plate 46L are identical to positioner 49R and plate 46R. Both the part positioner mounting plate and the part positioner itself, are upwardly-opening crescent-shaped and situated so as to be able to engage the chamfered conical edge 51R (FIGS. 7 and 8) of the positioner with the circular lower right-hand edge of the workpiece ring 50R after the ring 50R is placed in the work station by the loader. Similarly, the conical edge 51L of positioner 49L is able to engage the lower left-hand edge of ring 50L after the ring is placed in the work station by the loader. Then, as will be described below, the positioner/plate assemblies can be moved toward each other by the hydraulic actuators 48R and 48L to engage the workpiece rings by the chamfered surfaces 51R and 51L on the positioners. The camming action of the conical surfaces 51R and 51L serves to center the workpiece rings on the turning axis 56 of the spindles as the positioners lightly clamp the workpiece rings against each other. Then the hydraulic actuators 24 drive the clamp plate 23 and therewith the workpiece ring rotator adaptor 28 to the right and thereby drive the centered workpiece rings to the right against the adaptor 30 which therby becomes a workpiece ring abutment, as the driven spindle assembly 30D is mounted in the stationary stand 16 in essentially the same way as the driving spindle assembly is mounted in the clamp plate 23. Thereby the rings are securely clamped between adaptors 28 and 30. Then the actuators 48R and 48L for the positioner mounting plates are retracted, pulling the positioners out of the way to clear the turning tools to work on the rings.

Referring again to FIG. 8, it shows the combination of part positioner and positioner mounting plate. The vertical section thereof in FIG. 7, shows one shape. A slightly different shape is seen in FIG. 1, as the combination is shaped to accommodate larger rings. There may be several sets of positioners of various sizes, and having slightly different shapes in vertical section, for each of several differently sized positioner mounting plates, to accommodate a wide range of workpiece ring sizes. For ring outside diameters from 2 to 10 inches, four different sizes of positioners and mounting plates can be used. But in any case, the mounting plates will be mounted to the same drive rods 47L and 47R, regardless of the size of ring for which the plates are made.

While the positioner will usually be crescent-shaped for tool clearance, and may have a slot such as designated by the dotted line 51S at the bottom (FIG. 8), to facilitate chip and/or cutting fluid passage, the particular size, shape and configuration will depend upon the size of the part or parts to be machined, and the ultimate shape to be developed during the machining.

The double centering part positioners are useful for centering two rings at a time. Of course they can be used for centering one ring at a time, and are particularly useful for large and heavy rings. In either case, the positioner chamfers will engage an outboard edge of each ring of a pair, or the outboard edge at both sides of a single ring. In the latter case, the drive to the right in the direction of arrow 26 in FIG. 7, by the hydraulic actuators 24 driving the clamp plate 23 and thereby the ring rotator 28 to the right, will move the whole combination of the positioners and the workpiece ring to the right to clamp the workpiece ring against the driven spindle abutment 30 for machining to begin. Of course the centering positioners are retracted during the machining operation, as previously described.

From the foregoing description, it is evident that the various carriages or slides are somewhat remote from the work station, except for the external turning tool holding slide 61. The cylindrical cross section of the turning tool slide 61 facilitates employment of round lip seals 126 (FIG. 9) for good reliable sealing and cleaning of the slide as it moves the cutters 58 and 59 toward and away from the work. Rotation of the slide in the slide housing is avoided by a keying system comprising cam rollers mounted in the housing and received in keyways in the slide.

The system includes rollers 127 and 128 mounted on cylindrical holders 129 and 131, respectively. These holders fit in cylindrical sockets in the slide housing 62 and have a common axis 132 perpendicular to the slide bore axis 133. Roller 128 is centered on the axis of holder 131, but the axis of roller 127 is offset from the center of holder 129. Both holders can be turned in their sockets, if desired, but are normally secured by one setscrew 134 in housing 62 for holder 131, and two setscrews 135 and 136 for holder 129.

The depth of the holder in the socket is limited in each case by a snap ring 137 received in a groove in the holder and abutting the wall of the housing 62.

The rollers 127 and 128 are fittingly received in diametrically opposed longitudinally extending keyways 138 and 139, respectively, in the slide 61. Since the roller 127 is eccentrically mounted in the holder 129, and the setscrews 135 and 136 are dog point setscrews whose points are received in notched seats in holder 129, these setscrews can be used to turn the holder 129 about its axis 132 in its socket to move roller 127 out of a plane containing the holder axis 132 and slide bore axis 133, i.e. to the left or right in FIG. 9. This feature is useful to transversely load the slide 61 against the upper and lower ceramic bushings 142 and 143, respectively, if needed to compensate for clearance due to wear, for example. The loading is in a plane perpendicular to the workpiece rotating spindle axis 56 and is thereby well suited to apply bearing loads if and as needed to handle cutting loads on the turning tools. "O-ring" seals 141, each seated in a groove in the respective rollerholder, prevent the lubricant for ceramic bushings 142 and 143 from leaking out of the housing 62 around the roller holders 129 and 131. The toolholder 301 in slide 61, is keyed to the slide. Keyway 331 in the holder receives key 332 which is fastened in slide 61 by the screw 333.

Figure 11:
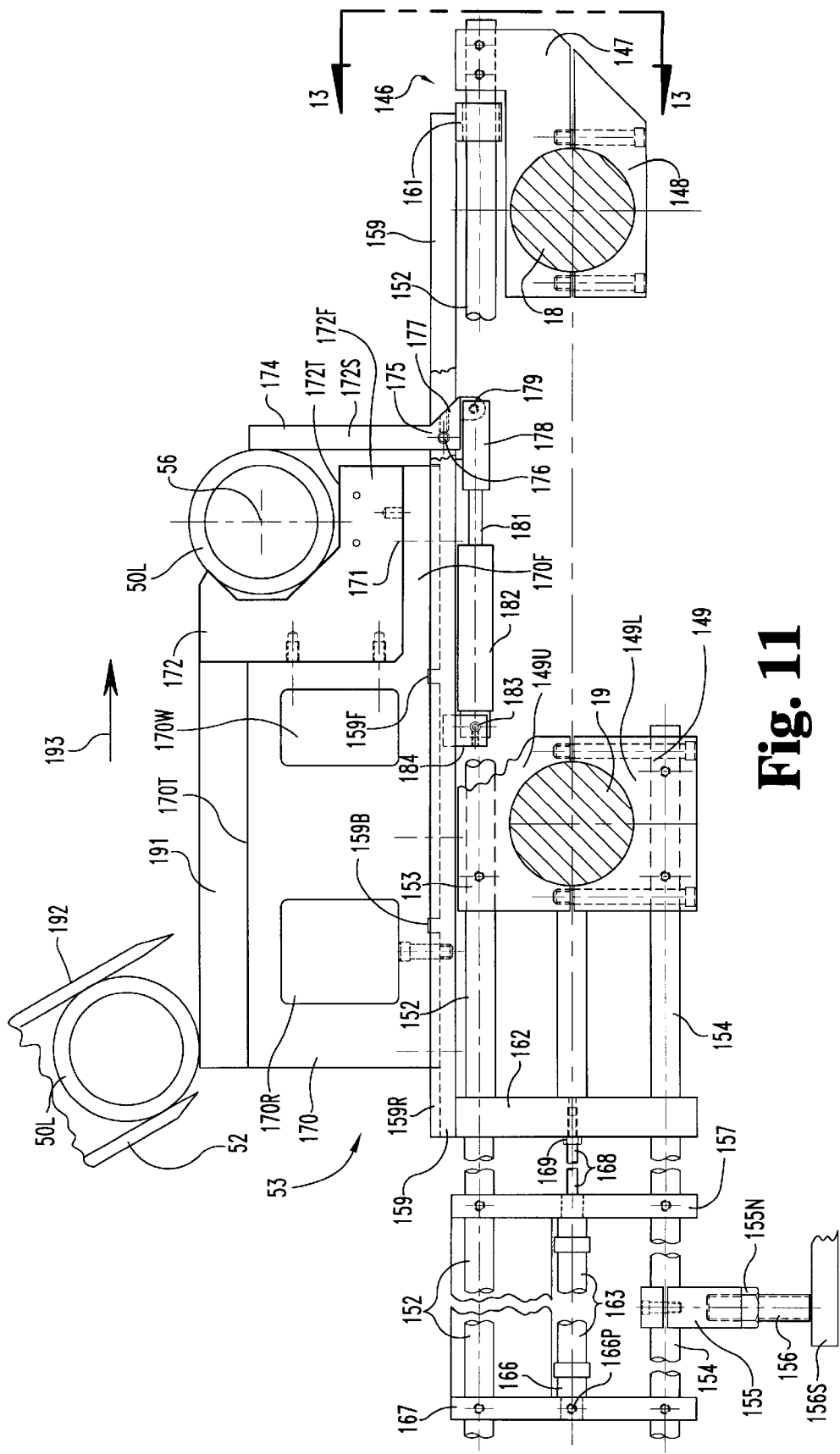
FIG. 11 is an enlarged elevational view showing the workpiece loader assembly as viewed in the direction from left to right in FIGS. 1 and 7 at a vertical plane immediately to the left of the workpiece ring 50L but before retracting from placement of workpiece ring 50L at the spindle axis.

Referring to FIGS. 11–13, the loader assembly 53 has a support structure including the front shaft support 146. This support includes the upper shell 147 and lower shell 148 which are clamped together around the machine frame bar 18. Similarly, an intermediate support 149 comprises upper 149U and lower 149L shells which are clamped to the machine rear frame bar 19. The front support 146 has an aperture in the upstanding boss atop upper shell 147 receiving and locating the front end of a shaft 152 secured in the aperture by a couple of setscrews. Similarly, the shaft 152 is secured in an aperture in the upper shell 149U of intermediate support clamp 149 by set screw 153. A lower shaft 154 is secured to the lower shell 149L of the intermediate support 149 by setscrews. A plate 157 has two apertures therein receiving each of the two shafts 152 and 154 which are secured to it by setscrews. A lower shaft support clamp block 155 is clamped to shaft 154 by a socket head cap screw. The block has a threaded rod 156 screwed into it and having a lower end resting on a lower support bar 156S fixed to the machine base. Height adjustment can be made by screwing threaded rod 156 into or out of block 155 and fixing it by the lock nut 155N.

A loader shuttle includes slide 158 having a table plate 159 with front and rear mounting bars 161 and 162 fastened to it. Bar 161 has a bushing slidably received on shaft 152. Bar 162 has bushings slidably received on shafts 152 and 154, whereby the table can slide freely toward and away from the machine spindle axis 56. In the drawings, the loader is shown advanced to the forward stop where it is holding the workpiece ring blanks 50L and 50R in a "part shoe" 172, centering the ring blanks on the center line 56 of the spindle. A loader slide drive hydraulic cylinder 163 has its front end received and supported by plate 157, and spaced equidistant from the shafts 152 and 154. The rear end 166 of the cylinder 163 is supported and dowel-pinned at 166P in the slide cylinder rear support plate 167 which is clamped to the two shafts 152 and 154 by set screws. The front end of the piston rod 168 is screwed into the bar 162 and locked by a nut 169 threaded on the end of the piston rod.

There is a recess 159R milled in the top of plate 159. The front and side edges of the recess are shown at 159E and 159S, respectively, in FIG. 12. A workpiece support wall 170, sometimes referred to herein as "loader locating plate", is fastened to the top of the table 159 in recess 159R by socket head cap screws, one of them installed in the bottom of "window" opening 170R in plate 170. The other is installed through the top of the front foot 170F of plate 170 at 171, FIG. 11. Two transversely extending bosses 159F and 159B project up from the top of the recess, and are slidably received in notches in the bottom of the plate 170, to facilitate lateral positioning of the plate 170 on the loader plate 159 prior to fastentin down at window 170R and foot 170F.

A part shoe 172 has a frontal "V"-notch sized and shaped for the specific workpiece ring blank to be handled. The part shoe is located by a dowel pin fixed in the foot 170F of plate 170 and projecting up at 173 into the part shoe. Two socket head cap screws installed through holes in the front wall of window 170W in plate 170 are received in threaded holes 172H (FIGS. 17 and 18) in the back wall of the part shoe, fastening it to the plate 170. In order for the loader to be adapted to different heights of part shoes, plate 170 is only as high as needed to accommodate ring blanks of the smallest outside diameter to be processed. For larger ring blanks, the top of the part shoe can be high enough that it would to project above the top of the plate 170. It is desirable that the part shoe be able to smoothly retract from the position shown in FIG. 11, to a position in which the part shoe foot 172F is under the rings in the supply chute 53. Projection of the part shoe above the top of the loader plate would interfere with smooth travel of the loader shuttle backward under the ring blanks in the chute. Therefore, an assortment of loader top plates such as 191 in FIG. 11 can be provided in heights needed to provide a smooth transition from the top of the plate to the top of the part shoe as the table is retracted from the forward position in FIG. 11 to receive another pair of ring blanks in the part shoe. Threaded holes are provided in the top of plate 170 to receive socket-head cap screws installed in counterbored holes in the top of plate 191 for easy attachment and replacement of a top plate to match the part shoe.

Referring to FIGS. 11–13, a workpiece stop bar 174, sometimes referred to as a "finger", has a portion of rectangular cross-section holding the rings in the part shoe. There is a pivot portion 175 at the lower end of the stop bar, in which a pivot pin 176 is secured by a setscrew. The pivot portion is received in a forwardly-opening yoke in the table 159, with the pivot pin rotatable in the arms of the yoke, thereby pivotally mounting the stop bar in the yoke. A tab 177 projects down from the front of the pivot portion into another yoke 178 and is pinned to the yoke 178 by the pin 179. The yoke 178 is mounted to the front end of piston rod 181 of the stop bar operating hydraulic cylinder 182 whose rear end is pinned by pin 183 secured by a setscrew to the cylinder rear end mounting tab. The pin 183 is received and pivotally mounted in a downwardly projecting yoke 184 secured to the bottom of the table. This cylinder 182 is hydraulically operable to drive the stop bar 174 from the workpiece stop position shown in FIG. 11 to a horizontal position 900 clockwise from the position shown, upon retraction of the piston rod 181 of the cylinder 182. Since it is a double-acting cylinder, extension of the piston rod will return the bar 174 to the upright rest position shown, to confine a workpiece ring blank/s in the part shoe.

A feature of the loader can be noted in FIG. 17 where the workpiece ring blank is shown in solid lines where it has rolled down onto the top 172T of the foot 172F of the part shoe when the loader slide has retracted to receive another couple of ring blanks 50L and 50R. When the bar-operating cylinder 182 is fully actuated, it pushes the ring blanks up the V-notch ramp 172R to a cradled, centered position on both ramps 172R and 172U of the part shoe. In this way, any dirt or chips which may have accumulated on the surface 172T cannot interfere with accurate centering of the blanks for gripping between the part positioners 49L and 49R.

Accessories on the table 159 or bar 162 at the rear end of the table, with tabs, mechanical limit switches or reed switches or other position sensing devices on stationary parts of the machine such as shell 149U or bar 157, or other means known in the art, may be used to respond to various achieved positions of the table 159. Other arrangements for position sensing may be used.

Supply of workpieces to the loader is similar to that disclosed in the aforementioned U.S. Pat. No. 5,293,794. The construction is somewhat different as shown in FIGS. 5, 11–13 and 16, to facilitate delivery of more than one workpiece at a time to the part shoes and to accommodate various lengths/widths of workpieces. Where two workpieces are to be made simultaneously according to the present invention, although two loaders could be used, side-by-side, it is preferable to use the single loader, but provide a wider locating plate 170 and part shoe 172. In every case, regardless of whether a single part is being machined, or two parts simultaneously, the part shoe should suit the shape and size of the part blank. The part shoe 172 and stop bar 174 can be standardized for a variety of part widths and diameters. They can be readily removed and replaced to accommodate different sizes and shapes. Normally, a single loader as shown in FIGS. 11-13 can be used with a part shoe wide enough to handle one or two ring blanks, as desired.

To supply the rings to the loader/s, two part guides 351 are provided. Each of these has two support posts 352 fixed thereto and which are received in apertures in part guide mounting plates 353 and 354. Plates 353 and 354 are clamped to the structural bar 19 by caps 353C and 354C for plates 353 and 354, respectively. These caps are fastened to the plates by socket head cap screws and enable orienting the assembly at the desired angle with respect to the machine, which is typically 45° as shown in FIG. 5. An additional cap 353D clamps the support post 352 for the guide 351 mounted on plate 353, in a fixed spacing from the plate 353 but which can be adjusted by loosening the clamp 353D and moving the guide in or out. Similarly, cap 354D clamps the post 352 for the other part guide at a fixed spaced relation to the mounting plate 354. To adjust the distance between the part guides 351 to accommodate a different length/width of workpiece, or multiple workpieces such as 50R and 50L, an adjustment screw 356 is threaded into the one guide 351 and clamped or locked in position by the nut 357. That screw extends through an unthreaded hole in plate 354. Lock nuts 358 and 359 are provided on the outboard and inboard faces of plate 354. To easily adjust the spacing between the part guides, clamp 354D is loosened, as are the locknuts 358 and 359. Then, one or the other of the nuts 358 and 359 is turned to move the part guide closer to or further away from plate 354 to the desired distance. Then both nuts 358 and 359 are tightened in place and the clamp 354 is again tightened. In this manner, the part guides can be spaced as needed to accommodate different widths of workpieces supplied to the loader shoe 172. As inferred above, if larger spacing adjustments are needed, clamp 353D can be loosened, and the associated part guide can then be moved closer to its mounting plate 353.

A gauging apparatus can be provided if desired, similar to that shown and described in the above-mentioned U.S. Pat. No. 5,293,794, the disclosure of which is incorporated by reference here, and need not be repeated herein.

OPERATION

Figure 14:
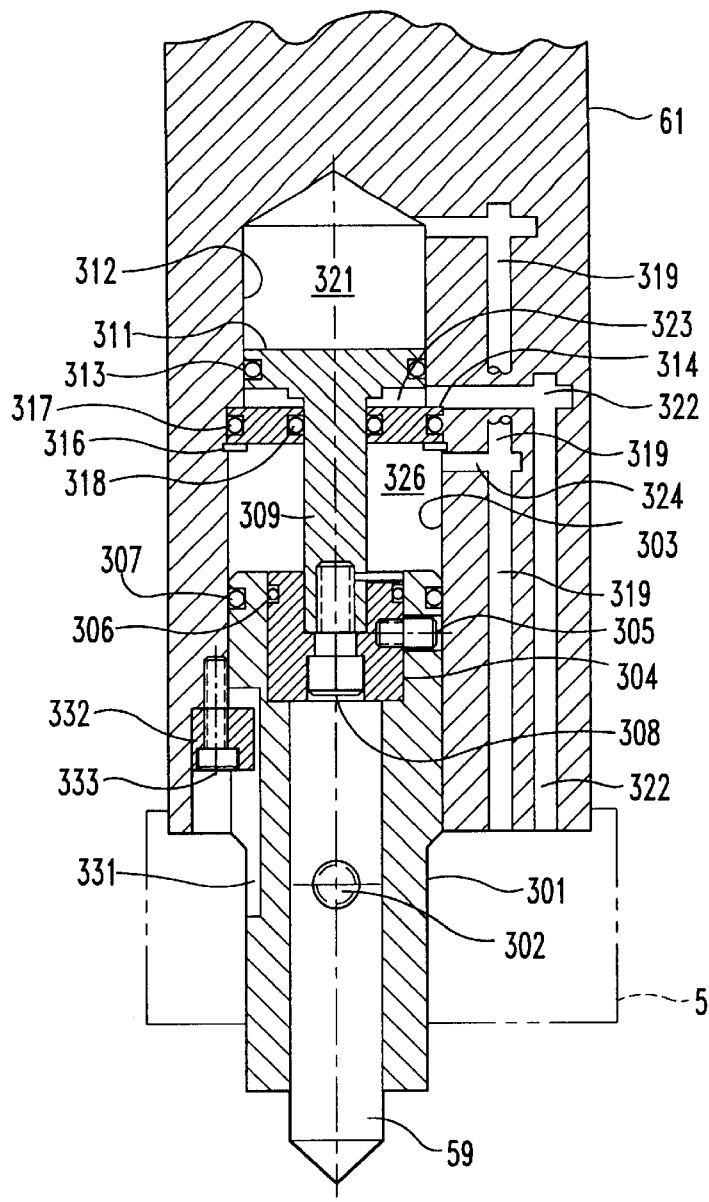
FIG. 14 is a longitudinal sectional view through a portion of the length of the slide 61 showing interior details of the advance and retract system for a third turning tool projecting through toolholder 57.

In the operation of the machine, the external tool holding slide 61 is retracted radially away from the turning axis 56 and the toolholder 301 (FIGS. 14 and 15) is retracted into slide 61. The slide 61 may also be retracted toward the left stop (FIGS. 1 and 7) depending on the programming for optimum processing of the particular shape of ring or rings to be produced. The boring bar will be retracted in the direction of arrow 26 so that the cutter 91 is inside the cavity in the left-hand end of the abutment 30. The positioner mounting plates 46L and 46R with positioners 49L and 49R secured to them are also retracted to the left and right, respectively, and the rotator 28 is retracted toward the left.

Workpiece rings 50L and 50R from the group resting on ramp 52 will have already moved down into position on top plate 191 (FIGS. 5 and 11) of the plate 170 of the loader 53. The ring blanks will be retained there between the ramp 52 and the top guide 192 of the supply chute outlet until the loader traverse cylinder 163 has driven the loader table 159 to its rearwardmost position whereupon the part shoe 172 will be directly under the discharge end of the supply chute 52. Then a pair of ring blanks may drop onto the foot 172F of the part shoe. They will be prevented from rolling out the front end of the part shoe by the stop bar 174. Then the loader moves forward toward the spindle axis 56 to a stop and standby position far enough away from the spindle axis to avoid interference with any of the machine components while the turning and boring of the previous rings is being completed. When that machining has been completed, the turning and boring tooling is withdrawn, the spindle is stopped. The ring rotator 28 is retracted to the left and the completely machined workpiece rings roll out into the gage entrance. Immediately, the loader traverse cylinder 163 drives the table 159 forward (to the right in the direction of arrow 193 in FIG. 11; to the left in FIG. 5) to locate the next workpiece rings into position shown in FIG. 11 where they are approximately centered on the turning axis 56 as shown in FIG. 11. Then the positioners 49L and 49R are advanced toward the rings by actuators 48L and 48R for positioners 49L and 49R to engage the left and right-hand edges of the workpiece ring blanks 50L and 50R, respectively, and move them toward each other and center them on spindle axis 56. As the rings are contacted and gripped between the positioners, the chamfered edges 51 of the positioners center the rings on the turning axis 56. As soon as the rings are centered and clamped by the positioners, the stop bar control cylinder 182 on the loader is actuated to retract the piston rod whereupon the stop bar 174 is pivoted down to the horizontal position to enable retraction of the table 159 from the rings and return to the back stop where the next workpiece ring blanks are received on the part shoe foot 172F. The table then moves forward to the standby position previously mentioned.

When the ring blanks become clamped between the positioners, the rotator 28 is then linearly actuated by the hydraulic actuators 24 on the clamp plate to drive it to the right against the force still exerted by the actuators 48R on the positioner 49R. This action is continued until the workpiece ring 50R engages the left-hand edge of the stop abutment 30. When the workpiece ring blanks are thus thoroughly clamped between the rotator 28 and the stop abutment 30, the hydraulic pressure is reversed in actuators 48R and 48L whereby the positioners are retracted, to the right (arrow 26 direction) for positioner 49R, and to the left (arrow 27) for positioner 49L, so they are out of the way of the external turning tools. Then the boring bar which has been moved so as to provide clearance between the cutter 91 and the inside of the workpiece ring blanks, as well as between the bar itself and the inside of the blanks, is advanced to the left. Therefore when the rotator 28 begins to be rotated by the drive motor, both the cutter 91 on the inside and one of the cutters 58 on the outside will be positioned to work on the workpiece simultaneously on a radial line from the turning axis 56 so the loads, both externally and internally due to the external turning and internal turning, will be essentially balanced. Then the $X_1$ and $X_2$ drives are moved to the extent needed for the depth of cut to be made to place the cutters in contact with the surface to be cut. Then the Y-axis drives are started for the turning operation. When the needed cuts have been made by both the external tools and the boring bar on both rings, chamfers can be made on the edges of the rings by the cutter 59. Of course, other cuts can be made by cutter 59. Then the tools can be returned to original position or at least positioned out of the way so that, when the clamp cylinder is released, the workpiece rings move out to the gage entrance or to a conveyor or storage bin, and another two ring blanks can be placed in the work station by the loader.

In the processing of one ring at a time with the double centering positioner of the present invention, both positioners may move toward each other, just as in processing two rings simultaneously. The centering chamfer of each positioner engages an edge of the workpiece ring blank and, together, they center the ring on the axis 56. Then the actuators 24 drive the combination to the right to engage the ring with the stop abutment 30 of the passive spindle, and clamp it for the machining to commence. The centering positioners retract and machining proceeds as described above.

In the machining operations, the feeds and speeds and the sequencing of the steps can be achieved in a conventional way, all under the control of a computing controller which is not a part of this invention. Depending on the nature of the rings produced, and inspection requirements, completed rings may enter gage assemblies as described in the aforementioned patent, for checking.

Since a single 10 inch diameter ring may weigh 90 pounds, the double positioners are particularly useful to handle the weight of such blanks. This and the above-mentioned positioner size choices are just examples of the diversity of sizes and weights of parts which may be processed on one machine, simply by changing the positioners and mounting plates. If a ring or rings are of such size or proportions to need some additional axial restraint while on the loader, part shoes such as 272 shown in FIG. 19 may be used. Such shoe can be mounted and doweled by a pin at 273 the same as the shoe of FIGS. 17 and 18. But it has a flange 272W to prevent a blank from slipping axially off the foot 272F in the direction of arrow 274. If the width of the blank or pair of blanks is great, a wider part shoe or a pair of part shoes which may be mirror images of each other may be mounted to a couple of shoe locator plates such as 170. Where two flanged part shoes are used, they are mirror images to confine the two workpiece rings 50L and 50R between the flanges. If the width of the ring blanks would be too great for a single loader, two loaders could be used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a machine for treating the surface of workpiece material at a work station in the machine and which comprises:
    a first holder for a tool for treating the surface;
    a device coupled to said holder for driving the holder toward and away from a center of the work station;
    a workpiece material rotator spindle having a spindle rotational axis;
    a workpiece material locating spindle rotatable on the spindle axis; and
    a first linear drive device coupled to one of the spindles for moving the one spindle and the workpiece material toward the other spindle to grip the workpiece material between the rotator spindle and the locating spindle to enable the rotator spindle to rotationally drive the workpiece material for treatment thereof;
    an improvement comprising:
    a first positioner associated with the work station and having a chamfered inside edge having an axis colinear with the spindle axis for engaging an outer peripheral edge of the workpiece material to be processed for centering the engaged workpiece material on the spindle axis; and
    a second positioner associated with the work station and having a chamfered inside edge having an axis colinear with the spindle axis for engaging an outer peripheral edge of the workpiece material to be processed for centering the engaged workpiece material on the spindle axis; and
    one of said positioners being movable relative to the spindles and toward the other of said positioners to grip the workpiece material between them.

2. In a machine for treating the surface of workpiece material at a work station in the machine and which comprises:
    a first holder for a tool for treating the surface;
    a device coupled to said holder for driving the holder toward and away from a center of the work station;

a workpiece material rotator spindle having a spindle rotational axis;

a workpiece material locating spindle rotatable on the spindle axis; and a first linear drive device coupled to one of the spindles for moving the one spindle and the workpiece material toward the other spindle to grip the workpiece material between the rotator spindle and the locating spindle to enable the rotator spindle to rotationally drive the workpiece material for treatment thereof;

a improvement comprising:

a first positioner associated with the work station for engaging an edge of the workpiece material to be processed for centering the so-engaged workpiece material on the spindle axis; and a second positioner associated with the work station and movable toward said first positioner for engaging an edge of the workpiece material to be processed for centering the so-engaged workpiece material on the spindle axis, one of said positioners being movable relative to the spindles and toward the other of said positioners to grip the material between them;

a loader associated with the work station to receive the workpiece material in individual workpieces from a supply and deliver them to the work station;

the loader being arranged to deliver the workpieces sequentially in pairs to the work station.

3. The improvement of claim 2 and wherein:

the positioners are arranged to clamp a pair of the workpieces together.

4. The improvement of claim 2 and wherein:

the positioners are arranged to center the workpieces of a delivered pair substantially simultaneously on the spindle axis.

5. The improvement of claim 2 and further comprising:

side guides spaced apart to receive workpieces between the side guides; and guide mounts secured to the side guides.

6. In the machine of claim 5 wherein the machine further includes:

an elongate base;

first, second and third stands secured to the base; and a shaft secured to at least one of the stands;

the improvement further comprising:

clamps fixing the guide mounts to the shaft.

7. The improvement of claim 6 and wherein:

at least one of the side guides is adjustably mounted to one of the guide mounts to enable adjusting the spacing between the side guides to fit workpieces of different thicknesses.

8. The improvement of claim 5 and wherein the workpieces are rings, the improvement further comprising:

a ramp to support a supply of rings in two columns;

the positioners being arranged to clamp two rings between them, and the side guides being spaced apart to receive the rings in pairs from the two columns of rings, and the loader further comprising:

a shuttle having a receiver to receive two rings at a time from the ramp and hold the two rings for simultaneous transport to the work station; and stop surfaces on the shuttle and normally holding the two rings in the receiver until clamped by the positioners.

9. The improvement of claim 3 and further comprising:

a first positioner drive device coupled to the first positioner, to drive the first positioner toward the second positioner to clamp the workpieces between the positioners.

10. The improvement of claim 9 and wherein:

the first linear drive device is coupled to the rotator spindle to drive the rotator spindle toward the locating spindle to clamp the workpieces between the spindles.

11. The improvement of claim 10 and wherein:

the drive devices are arranged such that the drive force potential of the first linear drive device exceeds the drive force potential of the first positioner drive device.

12. The improvement of claim 2 and wherein the loader further comprises:

a shuttle movable toward and away from the spindle axis;

a workpiece receiver mounted on the shuttle and having a cradle portion facing the spindle axis;

and a stop device mounted on the shuttle and operable on a workpiece to selectively confine it in and release it from the cradle portion.

13. The improvement of claim 12 and further comprising:

a workpiece support member mounted on the shuttle, the support member and receiver being mounted to provide substantially co-planar top surfaces to provide a surface enabling a workpiece ring to roll on the top surfaces from the support member to the receiver.

14. The improvement of claim and wherein:

the workpiece receiver has an upper front edge of the cradle portion and has a foot portion extending forward from the cradle portion, whereby the ring can roll over the front edge and drop onto the foot portion; and the stop device is forward of the foot portion.

15. The improvement of claim 14 and wherein:

the cradle portion is a notch and;

the stop device is a finger movably mounted to the shuttle and operable to push the workpiece ring upward and rearward from position resting on the foot portion to position centered in the notch.

16. In a machine for treating the surface of workpiece material at a work station in the machine and which comprises:

a first holder for a tool for treating the surface;

a device coupled to said holder for driving the holder toward and away from a center of the work station;

a workpiece material rotator spindle having a spindle rotational axis;

a workpiece material locating spindle rotatable on the spindle axis; and a first linear drive device coupled to one of the spindles for moving the one spindle and the workpiece material toward the other spindle to grip the workpiece material between the rotator spindle and the locating spindle to enable the rotator spindle to rotationally drive the workpiece material for treatment thereof;

an improvement comprising:

a first positioner associated with the work station for engaging an edge of the workpiece material to be processed for centering the so-engaged workpiece material on the spindle axis; and a second positioner associated with the work station for engaging an edge of the workpiece material to be processed for centering the so-engaged workpiece material on the spindle axis;

the positioners have centering surfaces thereon extending more than 180 degrees about the spindle axis and one of the positioners being movable relative to the spindles and toward the other positioner, to grip the material between them.

17. The improvement of claim 16 and wherein:
each of the centering surfaces of each positioner subtends an angle in excess of 90 degrees.

18. The improvement of claim 16 and wherein:
the centering surfaces are tapered and are interrupted at a location below the spindle axis to facilitate chip discharge from the work station.

19. In a machine for simultaneously removing material from the outer and inner surfaces of a ring at a work station in the machine and wherein the machine comprises:
a first holder for a tool for treating the outer surface;
a second holder for a tool for treating the inner surface;
devices coupled to said holders for driving the holders toward and away from a center of the work station;
a loader associated with the work station to deliver rings to the work station;
a ring rotator spindle having a spindle rotation axis;
a ring locating spindle rotatable on the spindle axis; and
a first linear drive device coupled to one of the spindles for moving one of the spindles and a delivered ring toward the other spindle to clamp the delivered ring between the spindles to enable the rotator spindle to rotationally drive the ring for treatment thereof;
an improvement comprising:
a first non-rotatable positioner associated with the work station for engaging a delivered ring and centering it on the spindle axis; and
a second non-rotatable positioner associated with the work station and movable toward said first positioner for engaging a delivered ring and centering it on the spindle axis;
one of said positioners being movable toward the other positioner to grip a ring or rings between them.

20. In a machine for simultaneously removing material from the outer and inner surfaces of a ring at a work station in the machine and wherein the machine comprises:
a first holder for a tool for treating the outer surface;
a second holder for a tool for treating the inner surface;
devices coupled to said holders for driving the holders toward and away from a center of the work station;
a loader associated with the work station to deliver rings to the work station;
a ring rotator spindle having a spindle rotation axis;
a ring locating spindle rotatable on the spindle axis; and
a first linear drive device coupled to one of the spindles for moving one of the spindles and a delivered ring toward the other spindle to clamp the delivered ring between the spindles to enable the rotator spindle to rotationally drive the ring for treatment thereof;
an improvement comprising:
a first positioner associated with the work station for engaging a delivered ring and centering it on the spindle axis; and
a second positioner associated with the work station for engaging a delivered ring and centering it on the spindle axis;
one of said positioners being movable relative to the spindles and toward the other of said positioners to grip a ring or rings between them;
the positioners having tapered ring-centering surfaces thereon extending more than 180 degrees about the spindle axis.

21. In a machine for simultaneously removing material from the outer and inner surfaces of a ring at a work station in the machine and wherein the machine comprises:
a first holder for a tool for treating the outer surface;
a second holder for a tool for treating the inner surface;
devices coupled to said holders for driving the holders toward and away from a center of the work station;
a loader associated with the work station to deliver rings to the work station;
a ring rotator spindle having a spindle rotation axis;
a ring locating spindle rotatable on the spindle axis; and
a first linear drive device coupled to one of the spindles for moving one of the spindles and a delivered ring toward the other spindle to clamp the delivered ring between the spindles to enable the rotator spindle to rotationally drive the ring for treatment thereof;
an improvement comprising:
a first positioner associated with the work station for engaging a delivered ring and centering it on the spindle axis; and
a second positioner associated with the work station for engaging a delivered ring and centering it on the spindle axis;
one of said positioners being movable relative to the spindles and toward the other positioner to grip a ring or rings between them; and
a first positioner drive device coupled to the first positioner for moving the first positioner and thereby moving the ring engaged by the first positioner toward the rotator spindle.

22. The improvement of claim 21 and further comprising:
a second positioner drive device coupled to the second positioner for moving the second positioner and thereby moving a ring toward the locating spindle.

23. In a machine for simultaneously removing material from the outer and inner surfaces of a ring at a work station in the machine and wherein the machine comprises:
a first holder for a tool for treating the outer surface;
a second holder for a tool for treating the inner surface;
devices coupled to said holders for driving the holders toward and away from a center of the work station;
a loader associated with the work station to deliver rings to the work station;
a ring rotator spindle having a spindle rotation axis;
a ring locating spindle rotatable on the spindle axis; and
a first linear drive device coupled to one of the spindles for moving one of the spindles and a delivered ring toward the other spindle to clamp the delivered ring between the spindles to enable the rotator spindle to rotationally drive the ring for treatment thereof;
an improvement comprising:
a first positioner associated with the work station for engaging a delivered ring and centering it on the spindle axis; and
a second positioner associated with the work station for engaging a delivered ring and centering it on the spindle axis;
one of the positioners being movable relative to the spindles and toward the other positioner to grip two rings between them;

a device to receive and hold two rings for simultaneous transport to the work station and hold the rings at the work station until clamped by the positioners;

the first linear drive device being operable to cause the spindles to clamp the two rings simultaneously between the rotator spindle and the locating spindle.

24. The improvement of claim 23 and wherein:

the first linear drive device and the first positioner drive device are powered such that the linear force delivery potential of the first linear drive device exceeds the linear force delivery potential of the first positioner drive device whereby the first linear drive device moves the rotator spindle and delivered rings toward the locating spindle while the first positioner drive device urges the first positioner against the driving force of the first linear drive device transmitted through the rings to the positioner.

25. The improvement of claim 24 and wherein:

the first positioner drive device is reversible to retract the first positioner from a ring following contact of the ring with the locating spindle.

26. The improvement of claim 25 and further comprising:

a second positioner drive device coupled to the second positioner for moving the second positioner, the second positioner drive device being reversible to retract the second positioner from a ring following retraction of the first positioner by the first positioner drive device.

27. The improvement of claim 23 and further comprising:

first and second tools mounted on the first tool holder to cut exterior surfaces on each of the two rings while they are clamped between the spindles; and third and fourth tools mounted on the second tool holder to cut interior surfaces on each of the two rings while they are clamped between the spindles.

28. The improvement of claim 27 and further comprising:

a first slide connected to and supporting the first tool holder for movement in the direction of the spindle axis;

a second slide mounted on the first slide for linear movement of the second slide with the first slide in the direction of the spindle axis as the first slide is moved in the direction of the spindle axis;

a fifth tool mounted to the second slide;

the first slide having a first feed device to move the first and second tools toward and away from the spindle axis;

the slides having a second feed device operable, when actuated to move the second slide and thereby the fifth tool relative to the first slide toward and away from the spindle axis.

29. In a machine for simultaneously removing material from the outer and inner surfaces of a ring at a work station in the machine and wherein the machine comprises:

a first holder for a tool for treating the outer surface;

a second holder for a tool for treating the inner surface;

devices coupled to said holders for driving the holders toward and away from a center of the work station;

a loader associated with the work station to deliver rings to the work station;

a ring rotator spindle having a spindle rotation axis;

a ring locating spindle rotatable on the spindle axis; and a first linear drive device coupled to one of the spindles for moving one of the spindles and a delivered ring toward the other spindle to clamp the delivered ring between the spindles to enable the rotator spindle to rotationally drive the ring for treatment thereof;

an improvement comprising:

a first positioner associated with the work station for engaging a delivered ring and centering it on the spindle axis; and a second positioner associated with the work station for engaging a delivered ring and centering it on the spindle axis;

one of the positioners being movable relative to the spindles and toward the other positioner to grip a ring or rings between them;

a first slide connected to and supporting the first tool holder for linear movement of the first toolholder in the direction of the spindle axis;

a second slide mounted on the first slide for linear movement of the second slide with the first slide in the direction of the spindle axis as the first slide is moved in the direction of the spindle axis, but the second slide being oriented for movement relative to the first slide in a direction transverse to the spindle axis.

30. The improvement of claim 29 and wherein:

the first slide has a guide receiving a portion of the second slide, the first slide has a first feed device to move the first tool holder toward and away from the spindle axis;

the slides having a second feed device operable, when actuated to move the second slide relative to the first slide toward and away from the spindle axis.

31. The improvement of claim 30 and wherein:

the second feed device includes a hydraulic cylinder on the first slide, and a piston operating in the cylinder; the improvement further comprising:

the second slide providing a third tool holder connected to the piston.

32. The improvement of claim 31 and wherein:

the second toolholder is mounted to the machine for movement along the axis to process the inside of the workpiece.

33. The improvement of claim 30 and wherein:

the second feed device includes a hydraulic cylinder on the first slide, and a piston operating in the cylinder; the improvement further comprising:

the second slide being connected to the piston.

* * * * *

UNITED STATES PATENT AND TRADEMARK OFFICE
CERTIFICATE OF CORRECTION

PATENT NO : 6,053,083
DATED : April 25, 2000
INVENTOR(S) : George N. Mosey

It is certified that error appears in the above-identified patent and that said Letters Patent are hereby corrected as shown below:

In column 3, line 52, please begin a new paragraph after "belt 32.".

In column 4, line 30, please change "Y1" to --$Y_1$--.

In column 5, line 23, please change "Y2" to --$Y_2$--.

In column 7, line 35, please insert --135-- before "and 135".

In column 8, line 36, please change "fastentin" to --fastening--.

In column 9, line 17, please change "900" to --90°--.

In column 13, line 11, please change "a improvement" to --an improvement--.

In column 14, line 29, please change "improvement of claim and" to --improvement of claim 13 and--.

Signed and Sealed this

Twenty-fourth Day of April, 2001

*Attest:*

NICHOLAS P. GODICI

*Attesting Officer*     *Acting Director of the United States Patent and Trademark Office*